(12) United States Patent
Modi

(10) Patent No.: US 7,464,109 B2
(45) Date of Patent: *Dec. 9, 2008

(54) SYSTEM AND METHOD OF COMPILING REAL PROPERTY INFORMATION FROM A CENTRAL DATABASE

(75) Inventor: Manoj Modi, Phoenix, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 288 days.

This patent is subject to a terminal disclaimer.

(21) Appl. No.: 10/676,621

(22) Filed: Sep. 30, 2003

(65) Prior Publication Data

US 2005/0080702 A1    Apr. 14, 2005

(51) Int. Cl.
*G06F 7/00* (2006.01)
*G06F 17/00* (2006.01)
*G06F 3/00* (2006.01)
(52) U.S. Cl. .................. 707/104.1; 715/200; 715/700
(58) Field of Classification Search .................. 707/3, 707/104.1; 715/200, 700; 705/14, 35, 36 R
See application file for complete search history.

(56) References Cited

U.S. PATENT DOCUMENTS 4,722,055 A * 1/1988 Roberts .................. 705/36 R
6,327,574 B1 * 12/2001 Kramer et al. ................ 705/14
6,694,329 B2 * 2/2004 Murray .................. 707/103 Y
2002/0147625 A1 * 10/2002 Kolke ............................. 705/9
2003/0036963 A1 * 2/2003 Jacobson et al. .............. 705/26
2003/0187756 A1 * 10/2003 Klivington et al. ............ 705/27
2004/0133493 A1 * 7/2004 Ford et al. ..................... 705/35

* cited by examiner

*Primary Examiner*—Apu Mofiz
*Assistant Examiner*—Te Chen
(74) *Attorney, Agent, or Firm*—Robert D. Atkins; Quarles & Brady LLP

(57) ABSTRACT

A computer network (10) uses a central database (48) to manage a portfolio of real property holdings. The real property information related to the portfolio is stored on the central database and organized into a plurality of information categories. A computer hosts a website (60) for users to access the central database and view one or more categories of the real property information. Each authorized user can edit the real property information and save the edited real property information back to the central database. Other users access the edited real property information from the central database. The central database can also be used to compile real property information for offering as collateral in a loan package. The lender is given access to the real property information through the website. The real property information as selected for review by the lender is made available on the website.

4 Claims, 10 Drawing Sheets

SYSTEM AND METHOD OF COMPILING REAL PROPERTY INFORMATION FROM A CENTRAL DATABASE

CROSS REFERENCE TO RELATED PATENT APPLICATION(S)

The present patent application is related to copending U.S. patent application Ser. No. 10/677,037, entitled "System and Method of Managing Real Property Through a Central Database", and filed concurrently herewith by Manoj Modi.

FIELD OF THE INVENTION

The present invention relates in general to property management and, more particularly, to system and method of compiling real property information from a central database.

BACKGROUND OF THE INVENTION

Many companies and individuals own or control vast amounts of property and other real holdings. Real property holdings can include commercial buildings, office space, manufacturing facilities, repair garages, warehouses, stores, and undeveloped land. The real property holdings also include related infrastructures such as electric service, communication networks, plumbing, heating, ventilation and air conditioning (HVAC) units, cabinets, counters, shelving, flooring, rack space, cranes, lifts, mechanical devices, machinery, office equipment, decor, and other fixtures which are not readily moveable and constitute an integral part of the property.

A self-serve moving and storage company is one example of an entity that may own significant holdings in real property. As a necessary part of its normal operation, the self-serve moving and storage company has a variety of real assets such as retail stores to rent trucks and trailers, repair facilities to perform maintenance, office space to manage the company, rental units for storage of customer belongings, and manufacturing and retrofit facilities to build and make improvements to equipment. The real property owned by the self-serve moving and storage company generally includes the building, land, and related infrastructures as described above.

Ideally, the real property and related infrastructures should be identified, tracked, maintained, and properly managed for the benefit of the company and to meet requirements imposed by local, state, and federal laws, including tax, environment, and zoning requirements. Unfortunately, for many companies holding large property portfolios, the reality is that the detailed property information has problems in terms of accuracy, completeness, timeliness, and consistency. The detailed property information is often found in a variety of locations and known to or tracked by many different people, often in a disjoint manner with little or no communication between resources. The property information may exist only with the local store or property manager. If the local manager should leave the company, retire, or be re-assigned to a new location, a significant amount of useful information is lost. There is no correlation, common knowledge, shared communication, or centralized management of the detailed and dynamically changing property information.

A regional or national property manager probably knows the location and general attributes, e.g. address, square footage, and principal usage, of each property under his or her control and responsibility. However, it is unlikely that the local manager in city A has any knowledge that a property in city B has for example a leaky roof, and likewise the local manager of the property in city B does not know or probably even care that the property in city A needs a new air conditioner. The regional or national property manager may only find out about these specific problems and needs when each is brought to his or her attention in the form of purchase order or authorization request for repairs. When the repairs are complete and the immediate need has passed, the information as to what happened, when, why, who, and where is often discarded or filed away in some isolated and forgotten box or file cabinet. Any future value in each specific property management data point is lost with the lack of any central record keeping procedure and the next crisis of the moment or other pressures of the business. The lack of complete, accurate, real-time information is a significant problem for most if not all property managers.

In the prior art, efforts have been made to organize information related to real properties. Property management information is generally kept by many different people and different departments, each having their own interests and needs. The maintenance department may keep maintenance records; the purchasing department keeps purchasing records; the finance department keeps financial records; the legal department keeps legal records; and so on. Multiple sets of lists, files, records, receipts, permits, appraisals, advisories, and reports may exist for example on computer-based spreadsheets, each within the cognizant department, but often with overlapping and sometimes conflicting information between groups. Most departments have little knowledge of or concern for what other departments keep track of and how such information is used.

Aside from the physical repair and maintenance of real property holdings, an overall property management program may also involve managing the real property portfolio as a financial asset of the company. Each property within a company's portfolio has a fair market value as determined by its location, land, square footage, useful features, convenient ingress and egress, curb appeal, condition of the structure and fixtures, past revenue generating performance and future potential, and the state of the local economy. The value of each property and the company's percent equity in the property will hopefully increase, but possibly decrease, over time with nature of the business, success of the marketing strategy, maturing of the customer base and sales growth, occupancy rate, and general direction of property values in the area.

When acquiring a new property, a common approach may involve a cash or cash-equivalent down-payment and a loan for the balance secured by the property being purchased. The downside of this approach is the need to invest hard cash in the new property. Depending on the business plan of the company and philosophy of the management team, another approach is to leverage the equity in existing properties as the basis to secure 100% financing, or minimal cash investment, to purchase new properties or otherwise borrow capital for the benefit of the company and its shareholders. Such a strategy allows a company to borrow without committing a significant amount of cash. The loan can be used to acquire new real properties, improve existing real property assets, upgrade equipment, invest in research and development, improve customer service, and acquire new businesses.

Most if not all lenders want to know considerable information about real properties being offered as collateral for loans to purchase other company assets and make capital improvements. Some lenders consider the use of existing real property as collateral to secure other real property to have some risk associated with the transaction. The lender must be protected in terms of fair market value of the leveraged property in the event of a foreclosure and default sale.

When the company owns a large number of properties, such information is often difficult to come by or compile in short order because of inadequate record keeping and constantly changing circumstances. The lender may have to send one or more teams to the borrower's place of business to conduct due diligence. If the borrower is offering multiple properties as packaged collateral, the lender may have to travel to several locations. The lender's due diligence and the borrower's compliance to the lender's demands becomes a laborious, time consuming, expensive, and error-prone process for both parties, especially when the relevant property information is scattered, dated, incomplete, lost, or otherwise hard to come by.

Moreover, the company may not even know all the valuable and attractive gems in their property portfolio which could be leveraged to help finance and grow the company. Again, the de-centralization of record keeping and many silos of information lead to missed opportunities and less than optimal processes and results for lenders and borrowers alike.

SUMMARY OF THE INVENTION

In one embodiment, the present invention is a method of displaying real property information comprising the steps of storing real property information from a portfolio of real properties on a central database, providing a website, organizing the real property information from the central database as a plurality of categories, providing selections for each of the plurality of categories on the website, selecting a category of real property information, retrieving the category of real property information from the central database, and displaying the category of real property information on the website.

In another embodiment, the present invention is a method of using a central database to manage real property comprising the steps of retrieving real property information from the central database, displaying the real property information on a website for a first user. The first user edits the real property information. The edited real property information is saved back in the central database.

In yet another embodiment, the present invention is a method of managing real property comprising the steps of storing real property information from a portfolio of real properties on a central database, providing a website, retrieving the real property information from the central database, and displaying the real property information from the central database on the website.

DETAILED DESCRIPTION OF THE DRAWINGS

Figure 1:
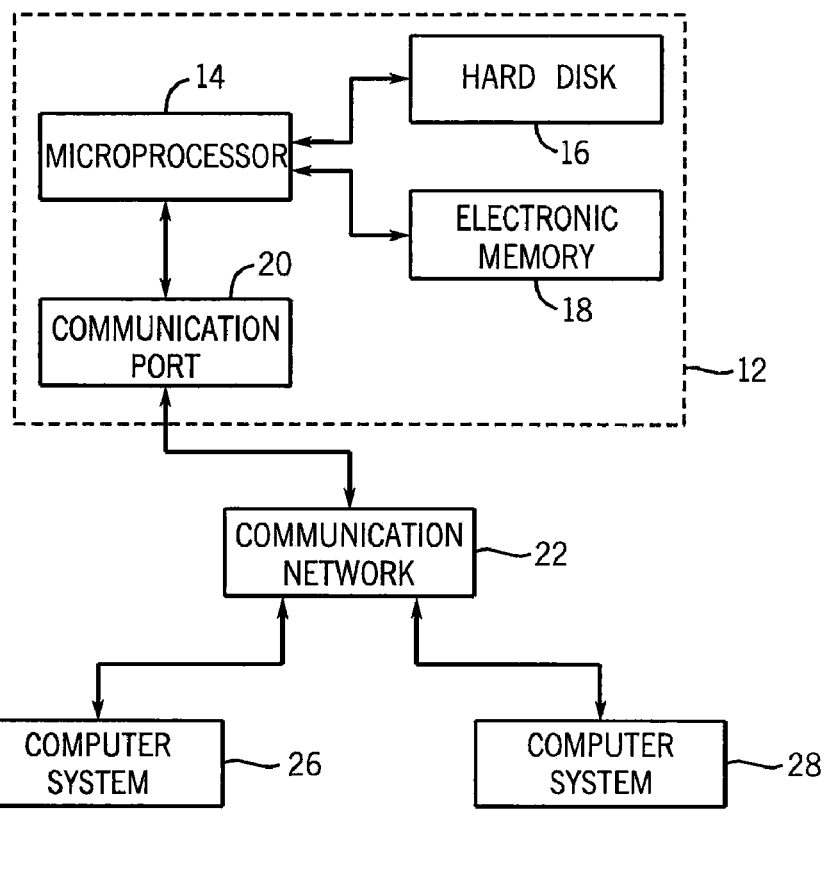
FIG. 1 is a block diagram of a computer network system used to host and access an internet-based website.

A computer system and network 10 is shown in FIG. 1 used to host and access an internet-based website. Computer system 12 is a general purpose computer including a central processing unit or microprocessor 14, mass storage device or hard disk 16, electronic memory 18, and communication port 20. Communication port 20 may be a high speed Ethernet connection to communication network 22. Communication network 22 is an open architecture system such as the world wide web, commonly known as the internet. Computer system 26 and computer system 28 are configured as shown for computer 12 and are also connected to communication network 22, which allows communication between computers 12, 26, and 28.

Computers 12, 26, and 28 can be physically located in any location with access to a modem or communication link to network 22. For example, computer 12 can be a central server at a company's home office. Computers 26 and 28 can be located in any company office, retail space in any state, new construction site connected by cell phone, or a hotel room, just to name a few.

Computer 12 runs application software which can be used to host one or more websites. Each website includes one or more webpages for viewing information and for receiving information from the user. The information displayed on each website is generally stored on hard disk 16, or other mass storage device accessible to computer 12. Users operating from computers 26 and 28 from any location can, via communication network 22, log into the website hosted by computer 12 to view information and enter information via the website.

As will be described further, a database or flat file is provided on hard disk 16. The database contains information related to real properties held by a company. Users from computers 26 and 28 can open the property management website on computer 12 and make requests to see the property related information. Computer 12 retrieves the property information from the database and displays the information on the webpages for the remote users. The users can gain understanding and make decisions about repairs, maintenance, and management of the property in question. With proper authorization, the users can add, delete, and update the information displayed on the webpages. The new and updated information is saved back to the database for future reference by the same user or other users.

Figure 2:
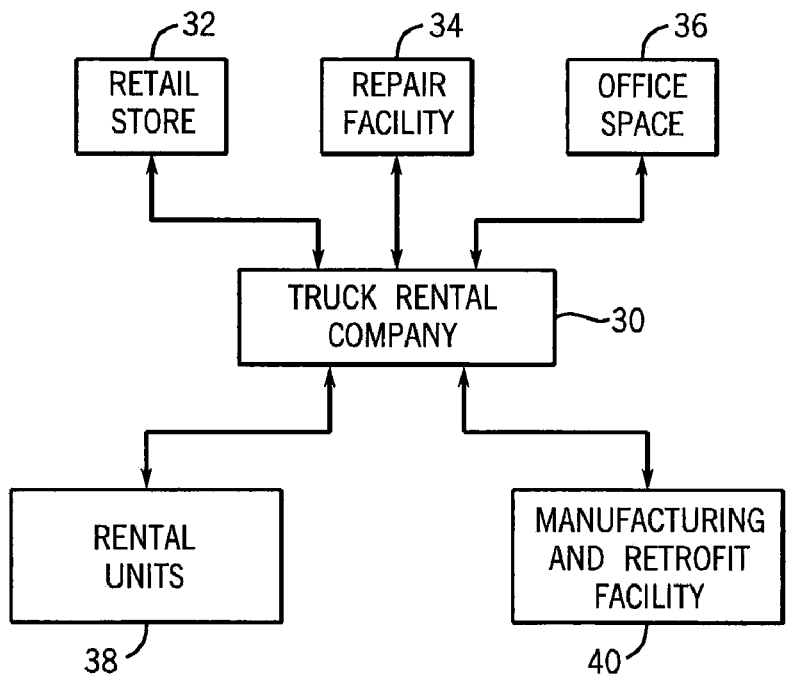
FIG. 2 illustrates several real property assets of a truck rental company.

Turning to FIG. 2, an individual, company, or other property holder owns, operates, and manages a large number of real property holdings in its portfolio. As an example, the property holder may be self-serve moving and storage company (truck rental company) 30 with significant property and other real holdings such as commercial buildings, office space, manufacturing facilities, repair garages, warehouses, stores, and undeveloped land. Truck rental company 30 owns and operates retail store 32 to rent trucks and trailers, repair facility 34 to perform maintenance, office space 36 to manage its operations, rental units 38 for storage of customer belongings, and manufacturing and retrofit facility 40 to build and make improvements to equipment. The real property holdings also include related infrastructures such as electric service, communication networks, plumbing, HVAC units, cabinets, counters, shelving, flooring, rack space, cranes, lifts, mechanical devices, machinery, office equipment, decor, and other fixtures which are not readily moveable and constitute an integral part of the property.

The real property and related infrastructures owned and operated by truck rental company 30 must be identified, tracked, maintained, and properly managed for the benefit of the company and to meet requirements imposed by local, state, and federal laws, including tax, environment, and zoning requirements. Each property may have a local manager and employees tasked to run the day-to-day business operations associated with the property. A regional or national property manager is responsible for overseeing multiple properties.

Figure 3:
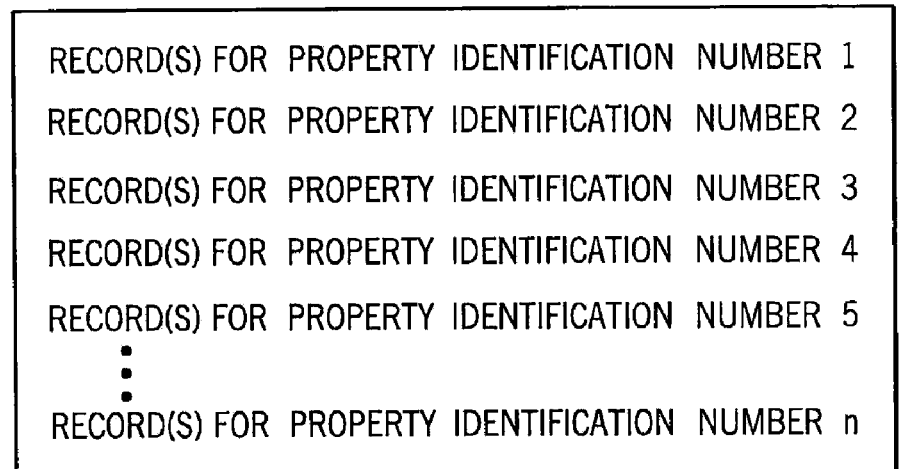
FIG. 3 illustrates a central database for storing property related information.

To aid its employees, managers, contractors, and vendors, truck rental company 30 maintains a central database 48 on computer 12, as shown in FIG. 3, to store and organize information related to its real property holdings. For each principal property, truck rental company 30 identifies and records relevant information associated with that property. Database 48 is accessed and controlled with application software or computer program(s) running on computer 12 with the associated microprocessor, memory, hard disk storage, and communication links such as shown in FIG. 1. Database 48 physically resides on hard disk 16. Database 48 may be organized as a relational database, flat file, or other organized structure of related records.

A property is considered the land, building(s), and fixtures found at one specific physical address. For example, retail store 32 located at a first physical address is a first property and constitutes one or more related property records in database 48. Repair facility 34 located at a second address is a second property and constitutes another set of related property records in database 48. Office space 36 located at a third address is a third property and constitutes another set of related property records in database 48. Rental units 38 located at a fourth address is a fourth property and constitutes another set of related property records in database 48. Manufacturing and retrofit facility 40 located at a fifth address is a fifth property and constitutes yet another set of related property records in database 48. The real property holdings are often located nationwide, in different cities and states, and may be in foreign countries.

Each property is assigned a unique property identification number and will have at least one record, and possibly a set of related records, depending on the organization of database 48. Retail store 32 is assigned property identification number 1; repair facility 34 is assigned property identification number 2; office space 36 is assigned property identification number 3; rental units 38 is assigned property identification number 4; and manufacturing and retrofit facility 40 is assigned property identification number 5. Assume database 48 stores information related to n number of individual real properties. In FIG. 3, property information related to retail store 32 is logically stored in database 48 under "record(s) for property identification number 1." Property information related to repair facility 34 is logically stored in database 48 under "record(s) for property identification number 2." Property information related to office space 36 is logically stored in database 48 under "record(s) for property identification number 3." Property information related to rental units 38 is logically stored in database 48 under "record(s) for property identification number 4." Property information related to manufacturing and retrofit facility 40 is logically stored in database 48 under "record(s) for property identification number 5."

Figure 4:
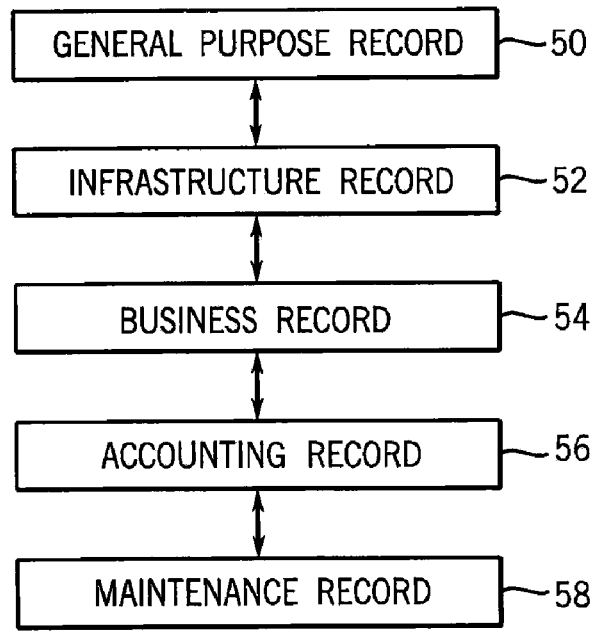
FIG. 4 illustrates related records in the central database.

In one embodiment, database 48 is organized into a plurality of categories of property related information by functional attributes of the property. Each property has a set of related records which deal with specific attributes associated with the property under a given category of information. The per property record format of property identification number m, where m is any assigned identification number, is shown in FIG. 4. There is one general purpose record 50 which contains fixed or relatively constant information about a particular property such as company assigned property identification number, address, phone number(s), fax number, email address, emergency and safety numbers, local manager, principal business purpose, tax identification number, certificate of occupancy, permits, area demographics, general photographs, maps, executive summary, etc. Infrastructure record 52, or group of records, is another category of information associated with the same property identification number m and provides specific infrastructure information related to square footage, acreage, detailed photographs of the property, rooms, layout, type of roof, electric service, communication networks, plumbing, HVAC units, cabinets, counters, shelving, flooring, rack space, cranes, lifts, storage units, bays in garage, mechanical devices, machinery, office equipment, decor, and other fixtures which are not readily moveable and constitute an integral part of the property. Business record 54, or group of records, is another category of information associated with the same property identification number m and provides business information such as services and products offered, prices, costs, sales history, percent occupancy, vendor lists, supplier lists, customer lists, inventory, number and specialties of local employees, and competitor information. Accounting record 56, or group of records, is another category of information associated with the same property identification number m and provides accounting information such as appraisals, book values, profit and loss statements, property tax records, depreciation schedules, liens, environment statement, title report, surveys, legal descriptions, title insurance, property insurance, certificate of occupancy, zoning compliance, site plans, and geo-technical analysis. Maintenance record 58, or group of records, is another category of information associated with the same property identification number m and provides maintenance information and related photographs such as present state of property, repair history, known repair action items, scheduled maintenance, service advisories, preventative maintenance schedules, records for underground storage tanks, environmental reports, contact information for local repair service, and needed or planned improvements.

Database 48 has the ability to attach documents to records. The documents may be provided in industry standard applications and formats. The photographs may be stored as joint photographic group (jpg) or tag image file (tif), the maintenance records stored as portable document files (pdf), executive summary as a word processing document, and financial statements as spreadsheets. Database 48 becomes a digital library of all documents associated and needed to support the real property holdings of truck rental company 30.

The above list is merely exemplary of the categories and organization of property related information that can be stored in database 48. Depending on the nature of the business, additional (or less) property related information can be organized and stored in database 48. For example, in a highly competitive market, there may be a separate record or group of records for competitive intelligence of property holdings by competitors. In an environmentally sensitive business, there may be a separate record or group of records for environmental impact data. In a heavily regulated market, there may be a separate record or group of records for government compliance with property holdings. Moreover, there may be a separate record or group of records for legal matters and litigation associated with the property holdings. In general, whatever property related information is important and useful to the company can be organized in database 48 for easy access and review.

To provide a useful property management tool, the property related information in centralized database 48 should be complete, accurate, and real-time. The property related information for each real property holding in the company portfolio must be entered into database 48. This step can occur when setting up the system or when acquiring a new property. The property related information typically exists on one or more documents which are analyzed, formatted, and entered into database 48. The conversion between the prior paper-based documentation and the computer-based organization of the records, files, and fields in database 48, as discussed above, is the first step in realizing a useful property management tool. The dynamics of real property management require continuous, real-time updates to the property related information records in database 48. Local managers change, improvements and repairs are made to the property, new photographs are taken of the property, customer lists grow, occupancy rates increase, more beneficial appraisals are done, updated property tax statements are received, up-to-date competitor information is acquired, and new litigation is initiated.

In a large company with a significant real property portfolio, no single person is cognizant or knowledgeable about all property related information and changes thereto. Each person or department has its expertise and area of interest. The property management tool provides for easy, convenient, and real-time access and updates to database 48 by those with the relevant knowledge. Each cognizant person or department enters and maintains their relevant category of property related information. With a central database 48, the property related information is maintained in a central location or from a distributed system operating as a single source. Those persons with the most knowledge about a particular piece of information are assigned the responsibility of maintaining that information. Yet, the same centralized information is accessible to all authorized users. Moreover, any change to the property related information made by one user becomes available to all authorized users.

Figure 5:
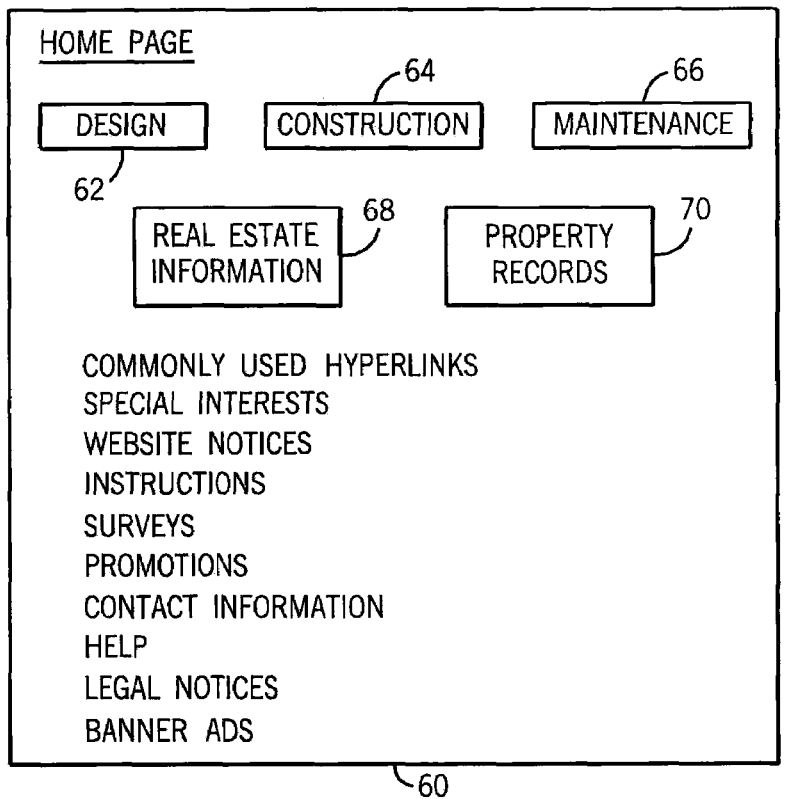
FIG. 5 illustrates a home webpage of the property management website.

The application software running on computer 12 and controlling database 48 provides an internet-based property management website portal 60 as shown in FIG. 5, which is accessible to authorized personnel to access, review, enter, and update property related information in database 48. The property management website portal 60 is implemented on computer 12 with access to database 48. Company employees, managers, contractors, vendors, and third parties with proper authorization can access property management website 60 from computers 26 and 28. Computers 26 and 28 can be located anywhere with a modem connection or other access to communication network 22. To access property management website 60, the company employee, manager, contractor, vendor, or other authorized user enters the uniform resource locator (URL) address for the website into the URL address line of his or her internet browser application. The user is launched to property management website 60 on computer 12.

A log-in box or log-in webpage appears for the user to enter his or her user name and password. The password provides a level of security and protection from unauthorized access. The log-in identifies the person and establishes the user's rights and privileges while browsing property management website 60 and the ability to enter new data, delete data, and change existing property related information in database 48. A general property manager or website administrator can be set up to view any property related information and make any desired changes at any time. Other managers may have defined records for viewing and limited authority to change information. Each users access is set by the system administrator and established by their log-in code. For example, the maintenance manager can be given access to view general purpose record 50, infrastructure record 52, and maintenance record 58, but may be blocked from viewing business record 54 and accounting record 56. The maintenance manager is limited to changing only maintenance record 58. The finance manager can be given access to view all records, but is limited to changing only accounting record 56. The log-in procedure can also be used to track user time and webpage access.

The first webpage of property management website 60, labeled as the Home Page, identifies truck rental company 30 and provides principal hyperlinks to other webpages and basic user information. Design 62 is a hyperlink to the design webpage. Construction 64 is a hyperlink to the construction webpage. Maintenance 66 is a hyperlink to the maintenance webpage. Real estate information 68 is a hyperlink to the real estate information webpage. Property records 70 is a hyperlink to the property records webpage. The basic user information includes topics such as commonly used hyperlinks, special interests, website notices, instructions, user surveys, special promotions, website contact information, help, legal notices, and banner ads.

Figure 6:
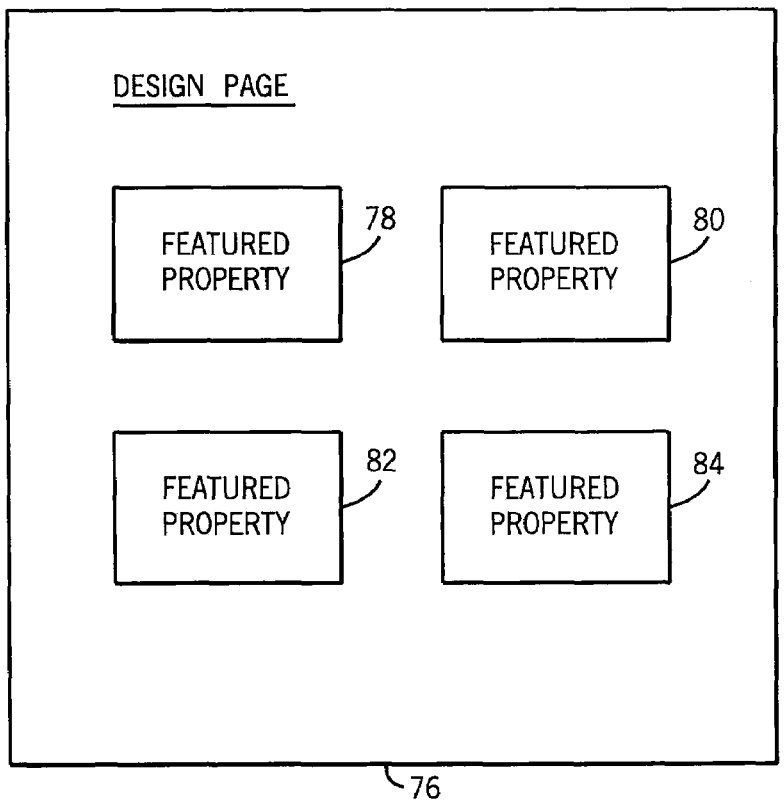
FIG. 6 illustrates a design webpage in the property management website.

Selecting design 62 launches the user to design webpage 76 which is shown in FIG. 6. Design webpage 76 includes several featured properties. Featured property 78 is a picture, descriptive text, and hyperlink to a first featured property. Featured property 80 is a picture, descriptive text, and hyperlink to a second featured property. Featured property 82 is a picture, descriptive text, and hyperlink to a third featured property. Featured property 84 is a picture, descriptive text, and hyperlink to a fourth featured property. Any one of the properties in truck rental company 30 portfolio may be selected as a featured property on website 60 for a number of reasons. A property may be featured because it is newly acquired, newly renovated, achieved some level of success or notoriety, or simply randomly selected. The hyperlink for the selected featured property launches the user to another webpage which displays several pictures of the selected featured property and interesting and useful property related information concerning the selected featured property as retrieved from database 48.

The property related information retrieved from database 48 for display on design webpage 76 and other linked webpages crosses information category boundaries. That is, some information may come from general purpose record 50 and some information may come from infrastructure record 52 to display the relevant information on design webpage 76. Likewise some information may come from business record 54, accounting record 56, and maintenance record 58 for display on design webpage 76. A feature of property management website 60 is that the property related information is retrieved from a central source, possibly from multiple categories, and integrated to provide a comprehensive presentation of the information for the user. Database 48 as the central source of information eliminates the overlapping, duplicative, and conflicting property information found in prior art systems. The property related information is accurate because each piece of information within an information category is kept in one place and maintained by person(s) cognizant of the information. There is little or no overlap between information categories, e.g. accounting record 56 does not contain maintenance information and maintenance record 58 does not contain accounting information. The integration of information from multiple categories to provide a comprehensive composite of the desired property related information is a useful property management tool.

If the user has sufficient rights and privileges, he or she can add, delete, and edit the property related information displayed on design webpage 76. The next user accessing the same property related information concerning the selected featured property will see the edits made by the first user.

Figure 7:
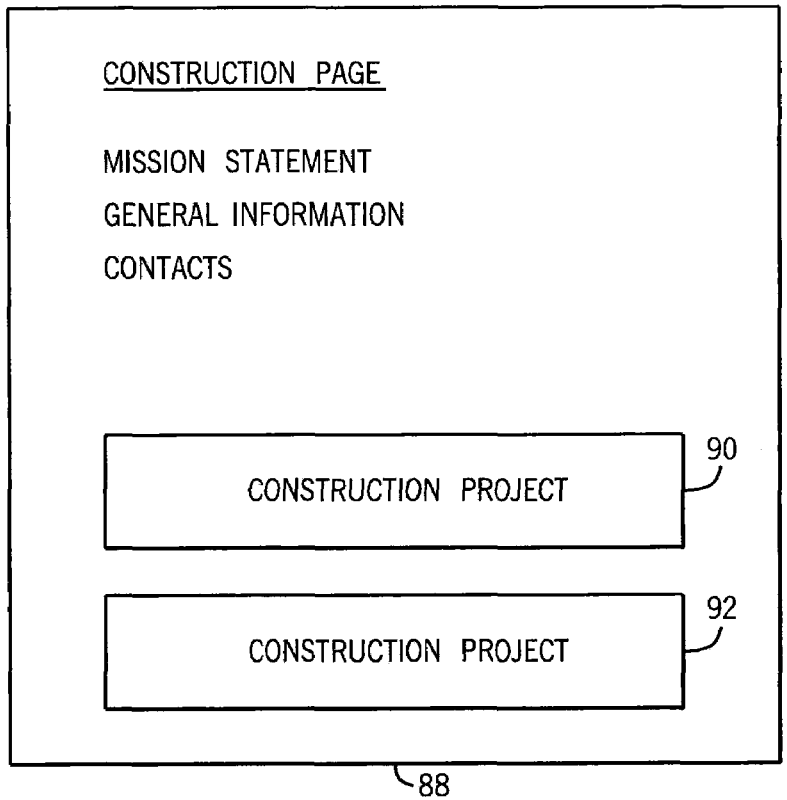
FIG. 7 illustrates a construction webpage in the property management website.

In FIG. 5, selecting construction 64 launches the user to construction webpage 88. Construction webpage 88, as shown in FIG. 7, includes a mission or purpose statement and general information related to construction projects planned, scheduled, or underway by truck rental company 30. A list of contacts for construction related matters, with hyperlinks to email addresses or contact information, is also provided on webpage 88. A list of contacts may includes construction managers, foremen, supervisors, specialists, consultants, builders, tradesman, craftsman, suppliers, inspectors, and government agencies. Construction project 90 is a picture, descriptive text, and hyperlink to a first construction project. Construction project 92 is a picture, descriptive text, and hyperlink to a second construction project. The hyperlink for the selected construction property launches the user to another webpage which displays several pictures of the selected construction project and interesting and useful property related information concerning the selected construction project as retrieved from database 48.

Similar to design webpage 76, the property related information retrieved from database 48 for display on construction webpage 88 crosses information category boundaries. Some information may come from general purpose record 50 and some information may come from infrastructure record 52, business record 54, accounting record 56, and maintenance record 58 for display on construction webpage 88. The integration of information from multiple categories provides a comprehensive composite of the desired property related information.

If the user has sufficient rights and privileges, he or she can add, delete, and edit the property related information concerning the selected construction project in database 48. The next user accessing the same property related information concerning the selected construction project will see the edits made by the first user.

Figure 8:
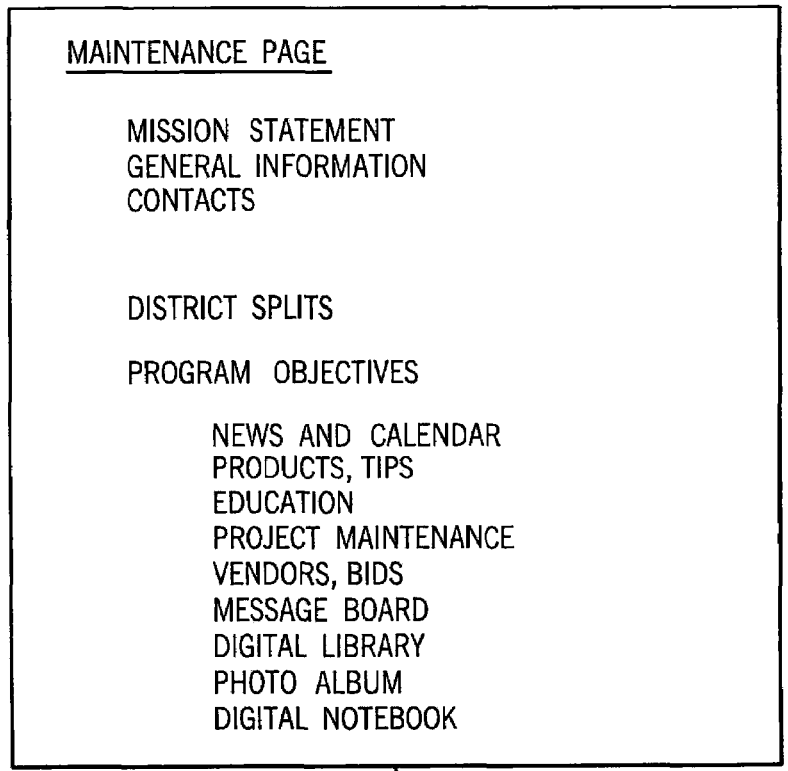
FIG. 8 illustrates a maintenance webpage in the property management website.

In FIG. 5, selecting maintenance 66 launches the user to maintenance webpage 98. Maintenance webpage 98, as shown in FIG. 8, includes a mission or purpose statement and general information related to repair, facilities, and maintenance projects planned, scheduled, or underway by truck rental company 30. A list of contacts for maintenance related matters, with hyperlinks to email addresses or contact information, is also provided on webpage 98. District splits allows truck rental company 30 to divide its territory, regionally or nationwide, into districts and assign individuals responsibility for one or more districts. The district splits identifies the districts and provides contact information for the responsible people.

Program objectives is a major grouping of property related information within the maintenance function available on webpage 98. The program objectives are displayed as a list of hyperlinks to the area of interest. The news and calendar hyperlink launches the user to a webpage which displays property related news and information in a calendar format. The property related news and information may include notices for special problems found, upcoming events, supplier issues, scheduled building maintenance, inspections, and cleaning tasks. The calendar can be presented on a monthly basis or day format within the month of interest.

The products and tips hyperlink launches the user to a webpage which displays property related information on such topics as new products, improvements, new tools, maintenance tips, pests, equipment tune-ups, energy savings, and solutions to common problems.

The education hyperlink launches the user to a webpage which provides property related information on such topics as vocabulary of terms, frequency asked questions (FAQs), early warning signs of pending problems, minimizing liability, what to do in the case of criminal mischief, and emergency plans, e.g. what to do if waterline bursts, loss of power, and adverse weather.

The project maintenance hyperlink launches the user to a webpage which displays property related information and helpful suggestions on such topics as roof and elevator maintenance, proactive and reactive maintenance, types of service contracts, certified specialists, maintenance schedule, seasonal inspections, preventative programs, and city codes.

The vendor and bids hyperlink launches the user to a webpage which displays property related information regarding qualified and approved vendors and suppliers which can provide repairs and service. The bidding information gives vendors and suppliers information on categories of bids accepted and how to submit bids to become an approved service provider.

The message board hyperlink launches the user to a webpage which provides a forum for users to post messages to the website generally. The users have an opportunity to share experiences and communicate with one another.

The digital library hyperlink launches the user to a webpage which provides access to files and documents related to the real property portfolio. The files and documents are stored on hard disk 16 and linked to database 48. The files and documents can be downloaded for display on website 60. The documents may include reports, appraisals, news bulletins, maps, certificates, manuals, warranties, assessments, leases, audits, maintenance records, inspections, invoices, legal documents, tax records, title reports, insurance, engineering reports, liens, easements, zoning information, compliances, security systems, computer aided design (CAD) files, drawings, budgets, bids, authorized vendors, contacts, forms, checklists, and any other written information related to the real property. The digital library webpage includes rules on document type, format, and submission, and instructions on how to upload and download documents.

The photo album hyperlink launches the user to a webpage which provides a forum for users to post photographs and related text on the website. The photographs include aerial shots, maps, site plans, drive-by views, exterior views, bays, lifts, hoists, elevators, offices, showrooms, retail space, parking lots, signage, storage units, roofs, building features, competitor images, and any other photograph related to or of interest for a particular property. The photo album webpage includes rules on file type, format, and submission, and instructions on how to upload and download pictures and text.

The digital notebook hyperlink launches the user to a webpage which displays property related information concerning maintenance actions taken and products installed at any property held by truck rental company 30. In practice, manager, employees, contractors, suppliers, and vendors acting on behalf of truck rental company 30 have the ability to access and add to the digital notebook. The digital notebook includes entries such as major expenditures, action logs, products installed, services performed, general comments, facility maintenance technician (FMT) entries, and any other notes and comments related to the real property portfolio. The ability to change the contents of the digital notebook may be reserved for certain authorized users. The digital notebook webpage includes rules on use of the digital notebook and instructions on how to enter and save information.

All the above described information displayed on maintenance webpage 98 comes from multiple categories of property related information. Again, some information may come from general purpose record 50 and some information may come from infrastructure record 52, business record 54, accounting record 56, and maintenance record 58 for display on maintenance webpage 98. For example, the scheduled building maintenance under the news and calendar hyperlink comes from maintenance record 58, the photographs exterior views and offices under the photo album hyperlink come from the infrastructure record 52, the bidding process under the vendor and bids hyperlink comes from the business record 54, and the appraisals and tax records under the digital library hyperlink comes from accounting record 56. The property management tool integrates information from multiple categories to provides a comprehensive composite of the desired property related information. The property related information is efficiently and accurately maintained because each piece of information is kept in one location, with little or no overlap between categories of information.

If the user has sufficient rights and privileges, he or she can add, delete, and edit maintenance webpage 98, and the hyperlinked program objectives, and then save the edited property related information back in database 48. The next user accessing the same property related information concerning maintenance webpage 98 or the hyperlinked program objectives will see the edits made by the first user.

In FIG. 5, selecting real estate information 68 launches the user to a real estate information webpage. The real estate webpage displays text related to legal property descriptions, title reports, title insurance, surveys, appraisals, insurance, certificate of occupancy, zoning compliance, contacts, environmental reports, underground storage tanks, and engineering reports. The presentation of information on the real estate information webpage comes from multiple categories of property related information. If the user has sufficient rights and privileges, he or she can add, delete, and edit the real estate information and then save the edited property related information back in database 48. The next user accessing the same real estate information will see the edits made by the first user.

Figure 9:
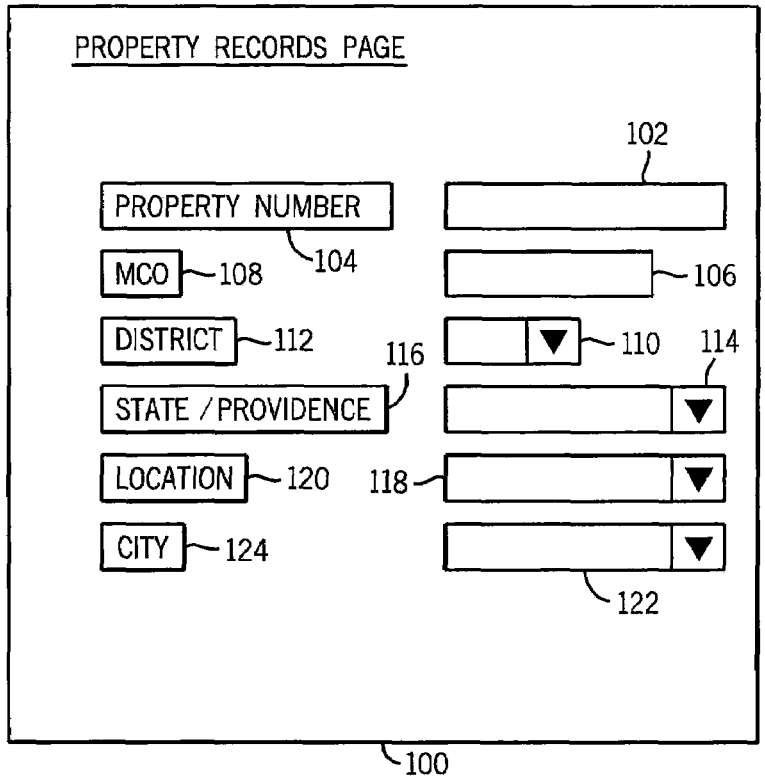
FIG. 9 illustrates a property records webpage in the property management website.

In FIG. 5, selecting property records 70 launches the user to property record webpage 100. Property record webpage 100, as shown in FIG. 9, displays a search screen for finding specific properties or groups of properties. The user can access a particular property by entering the property identification number in box 102 and clicking selection button 104. If the user is interested in retail store 32 located at the first address, then user simply enters property identification number 1 in box 102 and clicks selection button 104 and general purpose record 50 for retail store 32 is displayed on the screen.

If the property identification number is unknown or unavailable, then the user can enter the address or other known fields. The user can enter marketing company office (MCO) number in box 106 and click selection button 108. MCO is a regional office number. The user can enter the district identifier in box 110 and click selection button 112. The user can enter state or providence in box 114 and click selection button 116. The user can enter the property street location in box 118 and click selection button 120. The user can enter the city in box 122 and click selection button 124. One or more of the boxes, e.g. boxes 110, 114, 118, and 122, can be direct data entry and pull-down screens of known values.

Figure 10:
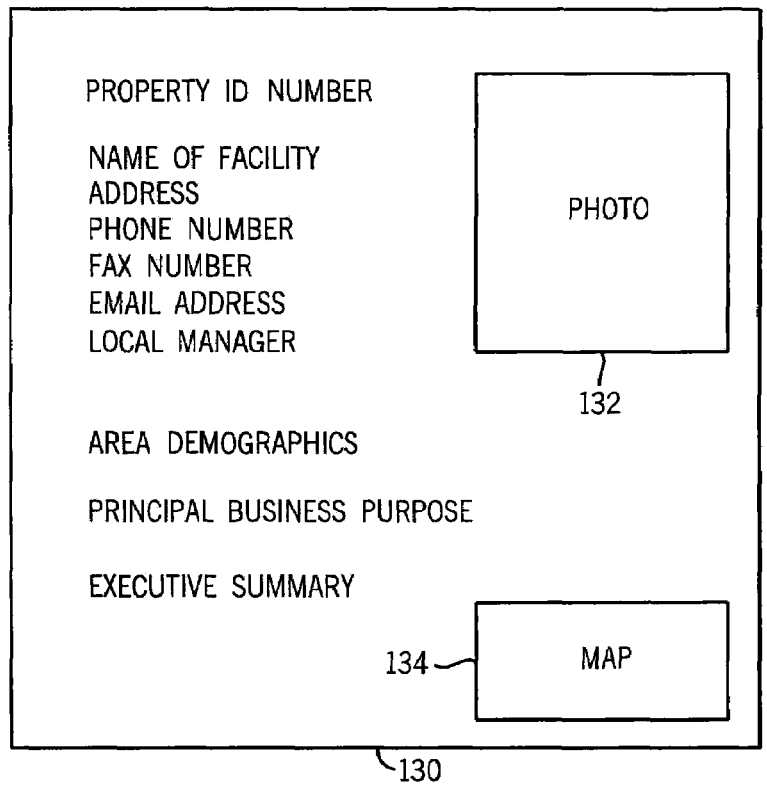
FIG. 10 illustrates the general purpose record from the central database.

Property record webpage 100 searches database 48 to find, retrieve, and present general purpose record 50, including text and photographs, as well as other property records if needed, for the property that matches the search criteria. FIG. 10 illustrates a property record webpage 130 displaying the general purpose record 50 for the selected property, including the company assigned property identification number, address, phone number(s), fax number, email address, local manager, area demographics, principal business purpose, and executive summary. FIG. 10 may also illustrate some information from infrastructure record 52. The property record webpage 130 shows one or more general photographs 132 and maps 134.

If more than one property matches the search terms, then a summary of matching properties is provided. The summary of matching properties shows a portion of general purpose record 50 for each property to help the user select the desired property. The user can scroll down the list of matching properties and select the property of interest. The general purpose record 50 for the selected property is then displayed as described above.

In addition to displaying the contents of general purpose record 50 for the selected property, property record webpage 100 also shows other the areas or categories of property related information. Property record webpage 100 displays, and links to other webpages that display, infrastructure record 52, business record 54, accounting record 56, and maintenance record 58. If authorized, the user can gather data from multiple records in database 48 for a complete, accurate, and real-time view of all available property related information.

Figure 11:
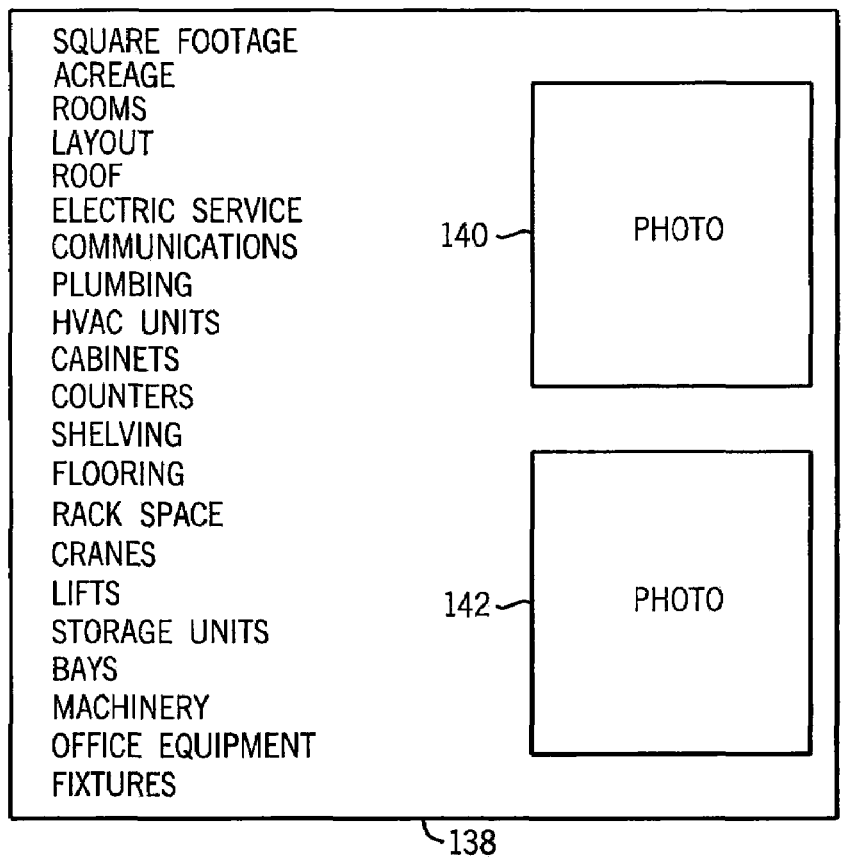
FIG. 11 illustrates the infrastructure record from the central database.

From property record webpage 100, or from any property related information webpage, the user can launch to infrastructure record 52 and display the complete infrastructure information for the selected property stored in database 48 as discussed above. FIG. 11 illustrates a property infrastructure webpage 138 displaying the infrastructure information for the selected property, including square footage, acreage, rooms, layout, roof, electric service, communications, plumbing, HVAC units, cabinets, counters, shelving, flooring, rack space, cranes, lifts, storage units, bays, machinery, office equipment, and fixtures. In addition, the property record webpage 138 shows photographs 140 and 142 for the selected property.

Consider a situation where the property manager is evaluating some new equipment to a particular property and wants to know the electrical and plumbing capacity and configuration to determine the extent of the utility re-work that will be needed. The new equipment may use a 220 volt, 3-phase motor. Knowing the existing electrical configuration of the installation site would be useful in planning the deployment of the new equipment. The property manager logs into property management website 60, selects the desired property on property record webpage 100, and goes to the infrastructure information webpage 138. The property manager notes that the property has a 110 volt, single phase electrical wiring configuration, which is incompatible with the electrical wiring requirements of the new equipment. The property manager has displayed and accessed information from maintenance record 58 and infrastructure record 52. With the composite property information from database 48, the property manager can plan accordingly or reconsider the installation altogether.

From property record webpage 100, or from any property related information webpage, the user can display business record 54 for the selected property as stored in database 48. The business information from business record 54 can be useful in a situation where the business manager wants to know which properties are under-performing in terms of revenue generation and which properties are exceeding projections for an upcoming meeting with the management team. The report may include financial information from accounting record 56. The business manager logs into property management website 60, selects the desired property on property record webpage 100, goes to the business information webpage, and collects the data from multiple information categories needed for the meeting.

From property record webpage 100, or from any property related information webpage, the user can display accounting record 56 for the selected property as stored in database 48. The accounting information from accounting record 56 can be useful for the accounting department or business manager.

From property record webpage 100, or from any property related information webpage, the user can display maintenance record 58 for the selected property as stored in database 48. Consider a situation where the local manager of retail store 30 calls the maintenance department for truck rental company 30 to report a non-functional air conditioner. The maintenance technician logs-in into property management website 60 and views the make, model, installation date, and service history of the air conditioner for retail store 30. Such information would have been stored in central database 48 when the property was acquired or when new equipment was installed and is now available for review by other users. The technician may learn that the air conditioner is under warranty or will find the local manufacturer-authorized air conditioner repair service. The technician is able to make such a quick and accurate determination because central database 48 contains all installation and service records for each piece of equipment installed at each property held by truck rental company 30. Database 48 includes documents attached to the maintenance records with warranty cards, receipts of prior work, and previous service reports made by other technicians. The technician may review service reports for similar air conditioners installed at other locations, or the technician may learn from prior service reports that the air conditioner is simply temperamental and needs to have the circuit breaker reset. Resetting the circuit breaker may not provide the optimal fix if the air conditioner unit goes down frequently, but at least the unit can be made operational for now and truck rental company 30 can plan and budget a permanent solution for a future date. The technician enters the disposition of the present service repair report into database 48 using property management website 60 and may notice an action item for replacement or overhaul of the air conditioner at some future date. The process of the technician entering the present service disposition into database 48 provides useful information for the next service request for the same or similar equipment. The lessons learned in the present job will not be lost but rather will be saved for the next job.

In another scenario, the maintenance technician may inspect a roof on office space 36 and determine that repairs will be needed within the next several months. The technician's report is entered into database 48 and lists the roof repair as a maintenance action item. The maintenance manager can then access property management website 60 and get a report of maintenance action items that need to be done and schedule the work accordingly. Moreover, come budget submission time, the maintenance manager can run a report of upcoming maintenance action items, e.g. air conditioner overhaul for retail store 32 and the roof repairs for office space 36, and submit an accurate and justified budget with minimal speculative line items.

In all of the above scenarios, if the user has sufficient rights and privileges, he or she can add, delete, and edit the property record information and then save the edited property record information back in database 48. The next user accessing the same property record information will see the edits made by the first user.

The user's log-in account establishes access to the other records of property related information. Each record in database 48, and possibly each field within each record, has an associated authorization code. The code identifies the level of access needed to view the contents and the level of access needed to change the contents. Each user can be assigned the appropriate level of authorization in order to perform his or her job function without creating unnecessary data security risks or otherwise compromising the integrity of database 48. If the user has sufficient rights and privileges, he or she can add, delete, and edit the property related information in database 48. The next user accessing the same property related information will see the edits made by the first user. Whether the user can view some or all of the records in database 48 is determined by the administrator. Read access to the most if not all records is limited to a need to know basis. Update authority is limited to a need to change basis. If the user is authorized to make edits to maintenance records only, then update access to infrastructure record 52, business record 54, and accounting record 56, and maintenance record 58 is blocked, or the user will need to get override authorization from the person or department cognizant and responsible for the desired property related information.

For each property related information webpage, the property related information associated with that webpage is retrieved from database 48. As discussed above, the property related information is initially entered into database 48. The task of maintaining and updating the records in database with the most recent, accurate, and complete information rests with those in the company that have the most knowledge and access to the information. Each record or field within database 48 is assigned a responsible party to maintain the information. For example, the business managers will keep up business records 54 because it is their responsibility and further because it is in their interest to do so. The accounting department will keep up accounting records 56 because it is their responsibility and it is in their interest to do so. The maintenance department will keep up the maintenance records 58 because it is in their responsibility and interest to do so. With each department or individual maintaining the property related information for which they are knowledgeable and cognizant, then as a whole, the property related information in central database 48 will contain and represent the most up-to-date information available about the real property holdings of truck rental company 30. The property related information for the real property holdings of truck rental company 30 is available to all authorized users through property management website 60 and centralized database 48.

Once people begin to rely on a centralized database 48, the desire to maintain it directly follows and becomes automatic. The synergy develops from contributions of property related information to a central resource, i.e. database 48. One set of information exists for all to use. Critical information moves across departmental boundaries. Each user will be able to access any and all property related information authorized for their log-in account. Database 48 is a real-time reflection of the dynamically changing state of affairs for the company's property portfolio.

In addition to reviewing specific properties, the user can run general reports across many properties with broad search terms. For example, the property manager may want to know all property in a given geographical region, or the business analyst may want to know which properties are profitable in the last quarter, or the maintenance manager may want to know which properties are known to need or likely to need repair in the next fiscal year.

Figure 12:
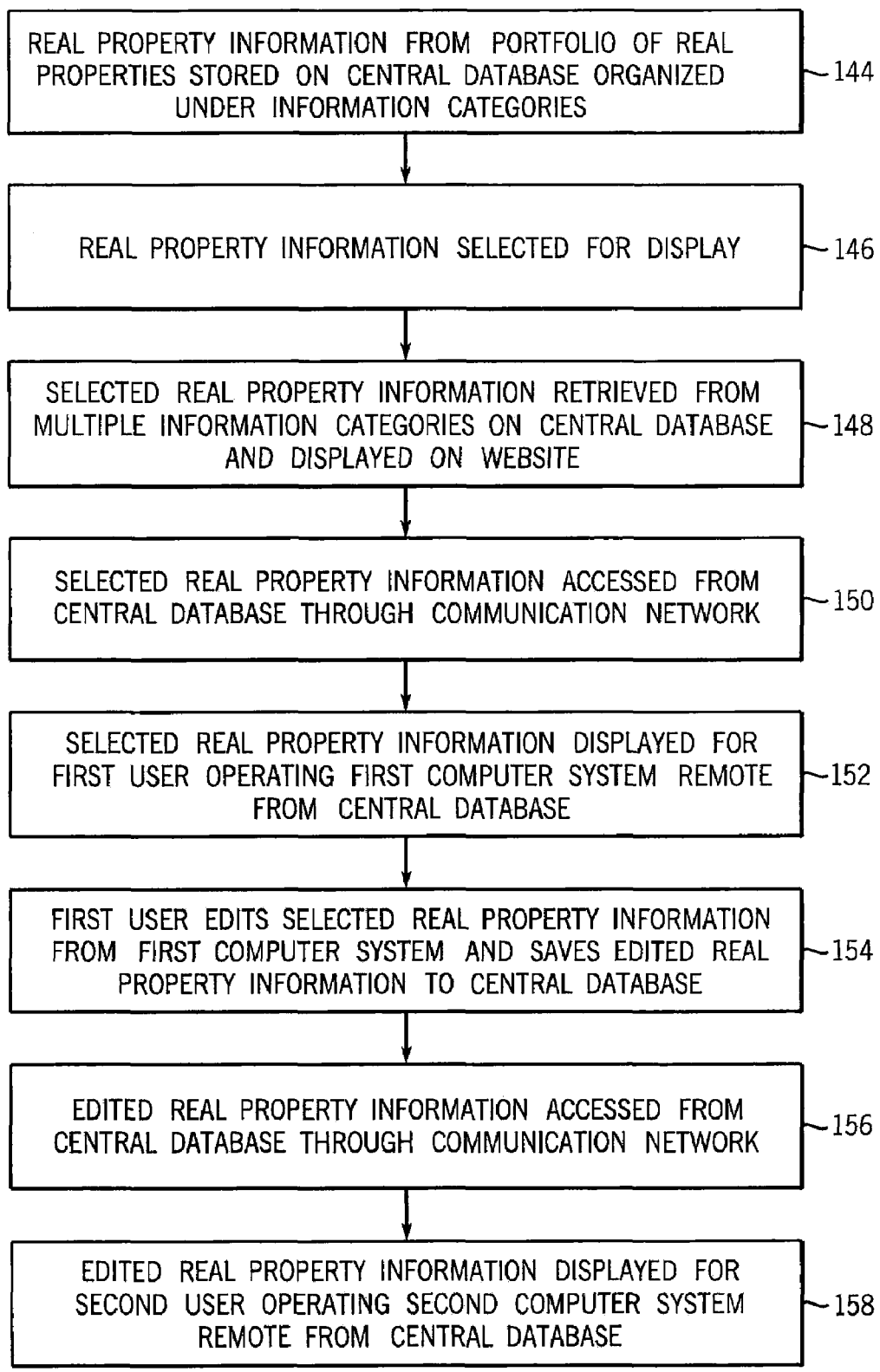
FIG. 12 illustrates the steps of managing real property assets through a central database.

The steps of managing real property through a central database is described in FIG. 12. In step 144, real property information from a portfolio of real properties is stored on a central database organized under a plurality of information categories. In step 146, the real property information from the central database is selected for display. In step 148, the selected real property information is retrieved from multiple information categories on central database and displayed on website. In step 150, the selected real property information is accessed from the central database through a communication network. In step 152, the selected real property information is displayed for a first user operating a first computer system remote from the central database. In step 154, the first user edits the selected real property information from the first computer system and saves edited real property information to the central database. In step 156, the edited real property information is accessed from the central database through the communication network. In step 158, the edited real property information is displayed for a second user operating a second computer system remote from the central database.

As discussed above, an overall property management program may also involve managing the real property portfolio as a financial asset of the company. Each property within a company's portfolio has a fair market value as determined by its location, land, square footage, useful features, convenient ingress and egress, curb appeal, condition of the structure and fixtures, past revenue generating performance and future potential, and the state of the local economy. The value of each property and the company's percent equity in the property hopefully increases, but possibly decreases, over time with nature of the business, success of the marketing strategy, maturing of the customer base and sales growth, occupancy rate, and general direction of property values in the area.

When taking out a loan from a bank or other financial institution, the management team may elect to leverage the equity in existing properties as the basis to secure 100% financing, or minimal cash investment. The approach of leveraging existing properties to purchase new properties or otherwise borrow capital for the benefit of the company has advantages over more conventional financing arrangements. Namely, using the equity in existing properties avoids the commitment of substantial quantities of hard cash for downpayments. The equity in existing properties arises from higher appraisal values which is related to the business success of the property. The loan can be used to acquire new real properties, improve existing real property assets, upgrade equipment, invest in research and development, improve customer service, and acquire new businesses.

To implement the strategy of leveraging equity in existing properties to finance new acquisitions, the company's management team must first organize their portfolio of properties and determine which property, or combination of properties, would be attractive to a lender in securing the desired financing. Based on prior experience of what has worked in the past, and from direct feedback from the lenders, truck rental company 30 selects one or more properties from its portfolio and forms a loan request package. The loan request package includes a loan application, proposed term of the loan, explanation of the purpose for the borrowed funds, and description of the collateral being offered. The loan request package is sent to one or more lenders.

Most if not all lenders want to know considerable information about real properties being offered as collateral for loans to purchase other company assets and make capital improvements. Some lenders consider the use of existing real property as collateral to secure other real property to have some risk associated with the transaction. The lender must be protected in terms of fair market value of the leveraged property in the event of a foreclosure and default sale.

Lenders, being in the business of loaning money, will consider the loan request package from truck rental company 30. The lender will naturally have many questions and requests for information, all part of the due diligence process, to confirm the value of the collateral and assess the risk associated with the transaction.

Consider a loan request package where truck rental company 30 wants to buy a new property and further wants to leverage the equity it holds in existing property in financing the new property. Truck rental company 30 has a valuable tool in that the property related information for all of its real properties is maintained on central database 48. The management team begins by reviewing the financial records for its property portfolio, including the most recent appraisal(s), which are stored in business record 54 and/or accounting record 56. The review of the financial records provides a wealth of information and can help truck rental company 30 find some real gems, in terms of value as financing collateral, that it otherwise might not be aware. The management team decides that, based on independent appraisals and other fair market value factors, the equity in retail store 32 and repair facility 34 should be sufficient collateral to entice the lender to approve the loan for the new property. The loan request package is finalized with retail store 32 and repair facility 34 being offered as collateral. In actual practice, the number of properties being offered as collateral in a loan request package may be ten, twenty, fifty, hundred properties or more depending on the loan amount, value of each property, and general market conditions.

The process of mixing and matching properties in a particular loan request package is as much as art as science. In general, a property valuation is made using a number of criteria, including cost of the property, book value (as carried on the balance sheet), and appraisal values. Sometimes, it is the appraised value that makes a property the most attractive at face value. Other times the book value is useful when the appraisal is unavailable or considered out-of-date. Another useful measurement of valuation is ratio of appraisal to book value. For example, a ratio of appraisal to book value in excess of 200% may be a good indicator for a property to be included within a certain loan request package. There is no set formula for determining property valuation and when a loan request package has sufficient equity value to qualify for the requested financing. In general, depending on the loan amount, term of the loan, purpose of the loan, and past performance of the borrower, each lender has their own threshold of risk tolerance to determine whether the quality and quantity of properties being offered as collateral in the loan request package are sufficient to approve the loan as requested. The due diligence process is intended to help confirm the disclosure and quality of the properties.

Figure 13:
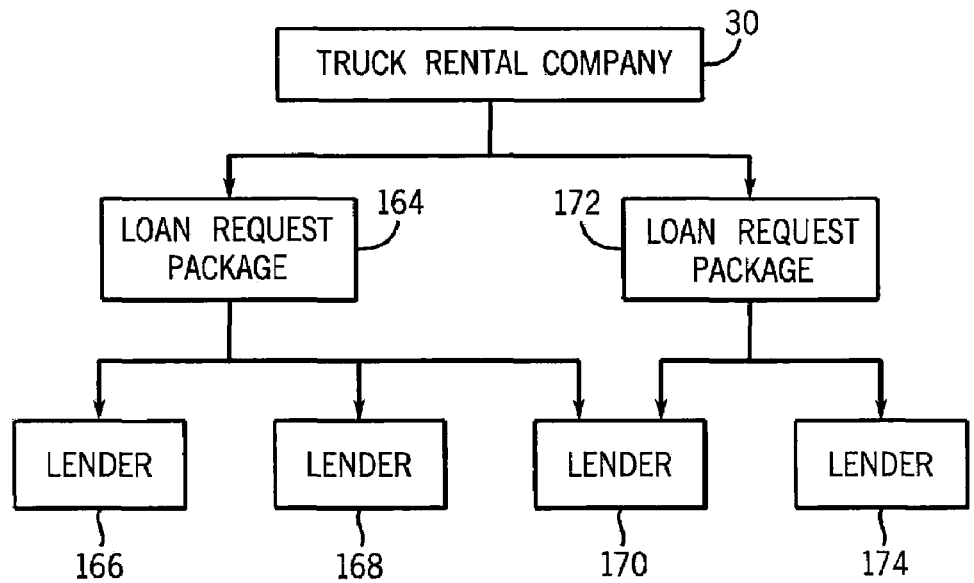
FIG. 13 illustrates creation of loan request packages for lenders.

In FIG. 13, truck rental company 30 creates loan request package 164 with retail store 32 and repair facility 34 being offered as collateral. Loan request package 164 is sent to lenders 166, 168, and 170. FIG. 13 further illustrates truck rental company 30 creating a second loan request package 172 and forwarding it to lenders 170 and 174. Loan request package 172 may involve the proposal to purchase another new property this time using the equity in office space 36, rental units 38, and manufacturing and retrofit facility 40 as collateral. The second loan request package 172 illustrates that truck rental company 30 may have multiple deals and associated loan requests going on simultaneously. Truck rental company 30 uses multiple lenders 166, 168, 170, and 174. Some lenders may receive one loan request package, while other lenders, e.g. lender 170, may receive multiple loan request packages.

Once the loan request package has been submitted to one or more lenders, truck rental company 30 understands that each lender will have a multitude of questions and requests for information, all part of the due diligence process. Each lender may be interested in different information depending on their own internal loan processing rules. Again, the fact that truck rental company 30 maintains its property related information on central database 48 can be a valuable tool and greatly simplify the due diligence process.

Figure 14:
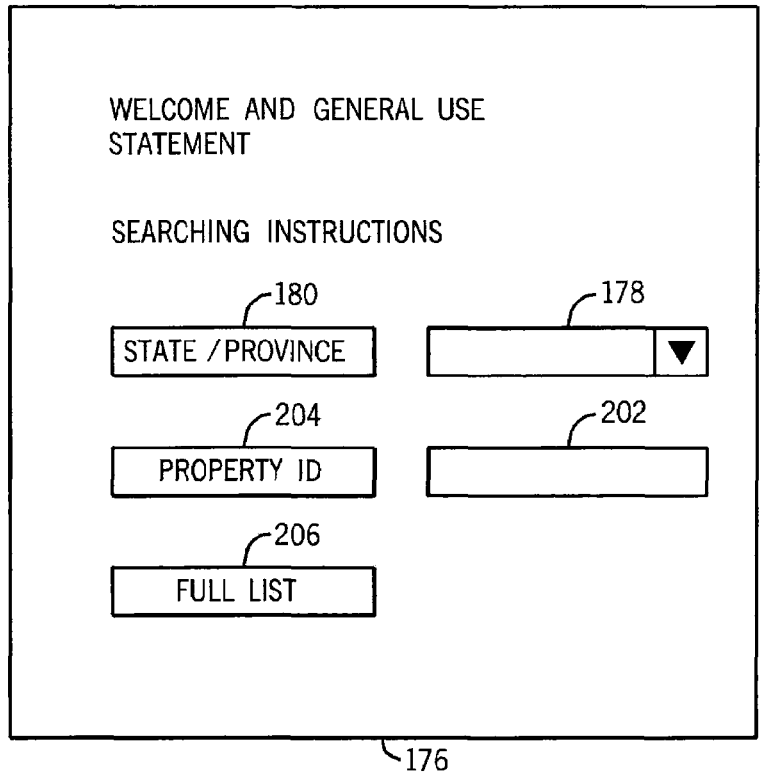
FIG. 14 illustrates a home webpage of an institutional lender website.

Truck rental company 30 provides institutional lender website 176 shown in FIG. 14 residing on computer 12 for disclosing financial information to prospective lenders. Website 176 interacts with central database 48 and includes one or more webpages for providing information and receiving information. Computer 12 runs application software to host website 176. The information provided on each webpage is stored on hard disk 16, or other mass storage device accessible to computer 12.

As part of the loan request package and to assist with the due diligence process, truck rental company 30 provides each lender a URL website address and log-in code. Website 176 and associated lower webpages provides a portal into central database 48 to review information related to the properties being offered as collateral for the subject loan. Based on the log-in code provided to the lender, each lender has certain predefined rights and access to the property related information in database 48. In general, each lender is restricted to those properties that are being offered as collateral for the loan request package being considered by the lender. Lenders 166 and 168 are limited to viewing property related information concerning retail store 32 and repair facility 34 from loan request package 164. Lender 174 is limited to viewing property related information concerning office space 36, rental units 38, and manufacturing and retrofit facility 40 from loan request package 172. Lender 170 has access the properties associated with loan request packages 164 and 172, although lender 170 may be restricted to one loan request package at a time. In all of the above cases, not all property related information for a particular property being offered as collateral is made available to the lender. In general, only property related information that is material and relevant to the loan review due diligence process is made available to the lender.

The lenders receive the benefit of reviewing the property related information from the convenience and efficiency of their own offices. For much of the due diligence process, there is no need to physically travel to the properties or offices of truck rental company 30. In the present case, computer 26 and 28 may be located in the offices of the lenders and connected by communication network 22 to computer 12. The lenders using computers 26 and 28 from their own offices open website 176 on computer 12 and request to see property information. Computer 12 retrieves the property information from the database and displays the information on the webpages of website 176 for the remote lenders.

Figure 15:
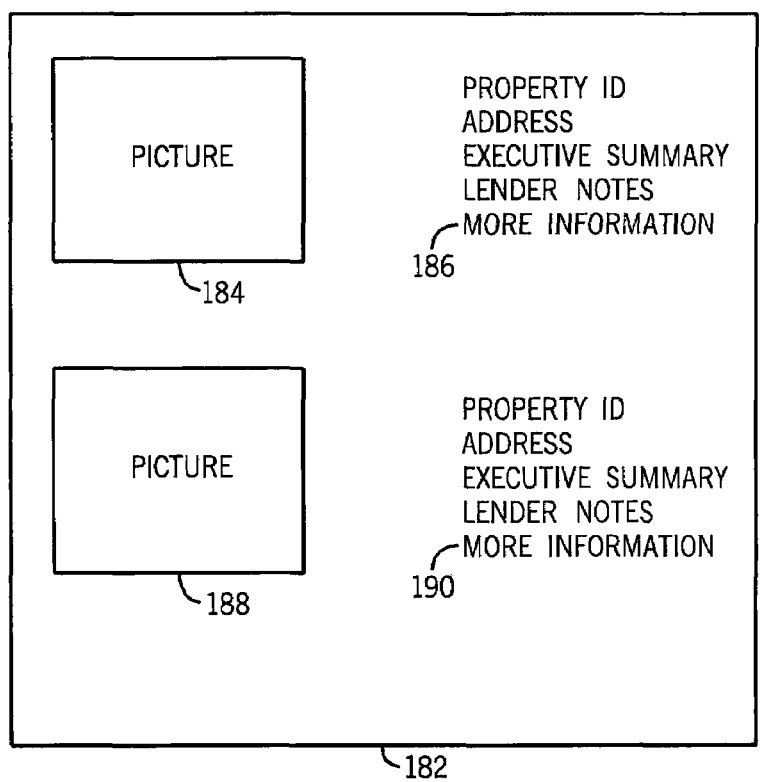
FIG. 15 illustrates a search summary webpage of the institutional lender website.

The first webpage on website 176 includes a welcome message customized for the lender as well as a general use statement, instructions, updates, and notices of use to the lender. Additional or special searching instructions are provided to aid in the searching process. Webpage 176 further provides a selection of search boxes to allow the lender to search for properties within the present loan request package. For example, lender 166 can enter a state or providence in box 178 and click state/providence selection button 180. Box 178 accepts direct data entry and can be used as a pull-down screen of known values. If lender 146 enters "Arizona" in box 178 and clicks selection button 180, then webpage 176 searches database 48 to find all properties within loan package 164 that are located in Arizona and displays a summary of the properties on webpage 182, as shown in FIG. 15.

Assume for the purpose of illustration that retail store 32 and repair facility 34 are located in Arizona. FIG. 15 illustrates webpage 182 with picture 184 of retail store 32. Webpage 182 further displays the property identification number, address, executive summary, and other lender notes related to retail store 32 that are particularly relevant to the lender. Database 48 may include such a special lender note field to make sure the latest information is brought to their attention on webpage 182. A "more information" hyperlink 186 is provided to launch the lender to a webpage that displays all property related information concerning retail store 32 that is material and relevant to the subject loan request package and due diligence being conducted by the lender. Webpage 182 further displays picture 188 of repair facility 34 and the property identification number, address, executive summary, and other lender notes related to repair facility 34 that are particularly relevant to the lender. A "more information" hyperlink 190 is provided to launch the lender to a webpage that displays all property related information concerning office space 36 that is material and relevant to the subject loan request package and due diligence being conducted by the lender.

Figure 16:
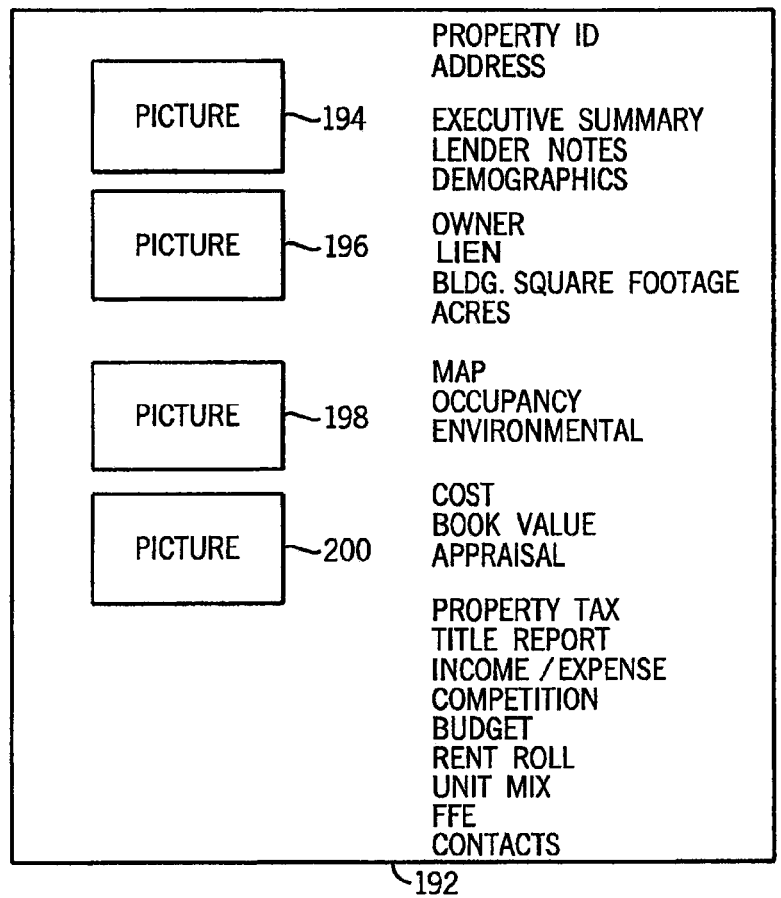
FIG. 16 illustrates a detailed property related information webpage of the institutional lender website.

In FIG. 16, webpage 192 illustrates a complete listing of property related information concerning retail store 32 that is material and relevant to the subject loan request package and due diligence being conducted by the lender. The property related information is stored in central database 48 and retrieved on command by the software operating on computer 12. Pictures 194, 196, 198, and 200 show various views and aspects of retail store 32. Webpage 192 displays property identification number, address, executive summary, lender notes, demographics, owner, liens, building square footage, land acres, map, occupancy, and environmental reports. Webpage 192 also displays property cost, book value, and appraisals with hyperlinks to associated reports, spreadsheets, and accounting records in support of the valuations. Webpage 192 further displays and/or provides hyperlinks to property tax records, title reports, income/expense statements, competition information, budgets, rent roll, unit mix, furniture, fixtures and equipment (FFE), and contacts.

Each record or field of data in database 48 is selectable to be included for viewing on webpages 182 and 192. A representative from truck rental company 30 selects which pictures and which property related information is to be displayed for the lender. If new pictures and information become available, the pictures and information are stored on database 48 and selected by the representative to be shown on the lender webpages. To change which pictures and information are to be shown to the lenders, the representative simply de-selects the pictures and information which are no longer to be shown to the lenders and selects the pictures and information which are to be shown to the lenders. When computer 12 queries database 48 for property related information for the selected property, it filters out that information which has not been approved for lender viewing. Only the property related information that has been approved for lender viewing is displayed on webpages 182 and 192.

Returning to FIG. 14, lenders can also search on specific property identification number by entering the desired number in box 202 and clicking selection box 204. The lender is taken to webpage 192 as shown in FIG. 16 with the property related information for the specified property identification number. Clicking full list selection box 206 displays all properties for lender's loan request package in the summary format of webpage 182 in FIG. 15. The lender can request more information from webpage 182 as described above if needed.

The lender can browse and review the most recent and up-to-date property related information at their convenience. If a particular item of information is missing or incomplete, then the representative from truck rental company 30 can change the settings in database 48 such that the requested information is displayed for the lender. If certain property related information is updated or becomes available, e.g. new appraisal or latest income/expense statement or news of a flood on the property, then truck rental company 30 need only update central database 48 and the information is immediately available for all lenders. Truck rental company 30 does not need to regenerate large volumes of paper for the lender for the original loan request package or each time the property related information changes. All that is needed is to update database 48 and include a note to the lender in the special lender note field that certain information has been changed.

Using an internet-based access of central database 48 to compile property related information for financial institutions offers a number of advantages. When a company owns a large number of properties, having the property related information is a common or central storage location simplifies the access for many users. The property related information can be compiled in short order from a central source. The property related information is accessible for any computer system with an internet connection. Lenders do not have to incur the time and expense of sending due diligence teams to multiple locations to gather all the property related information to process the loan documents. The relevant information is available from central database 48 and displayed the webpages as described above.

Figure 17:
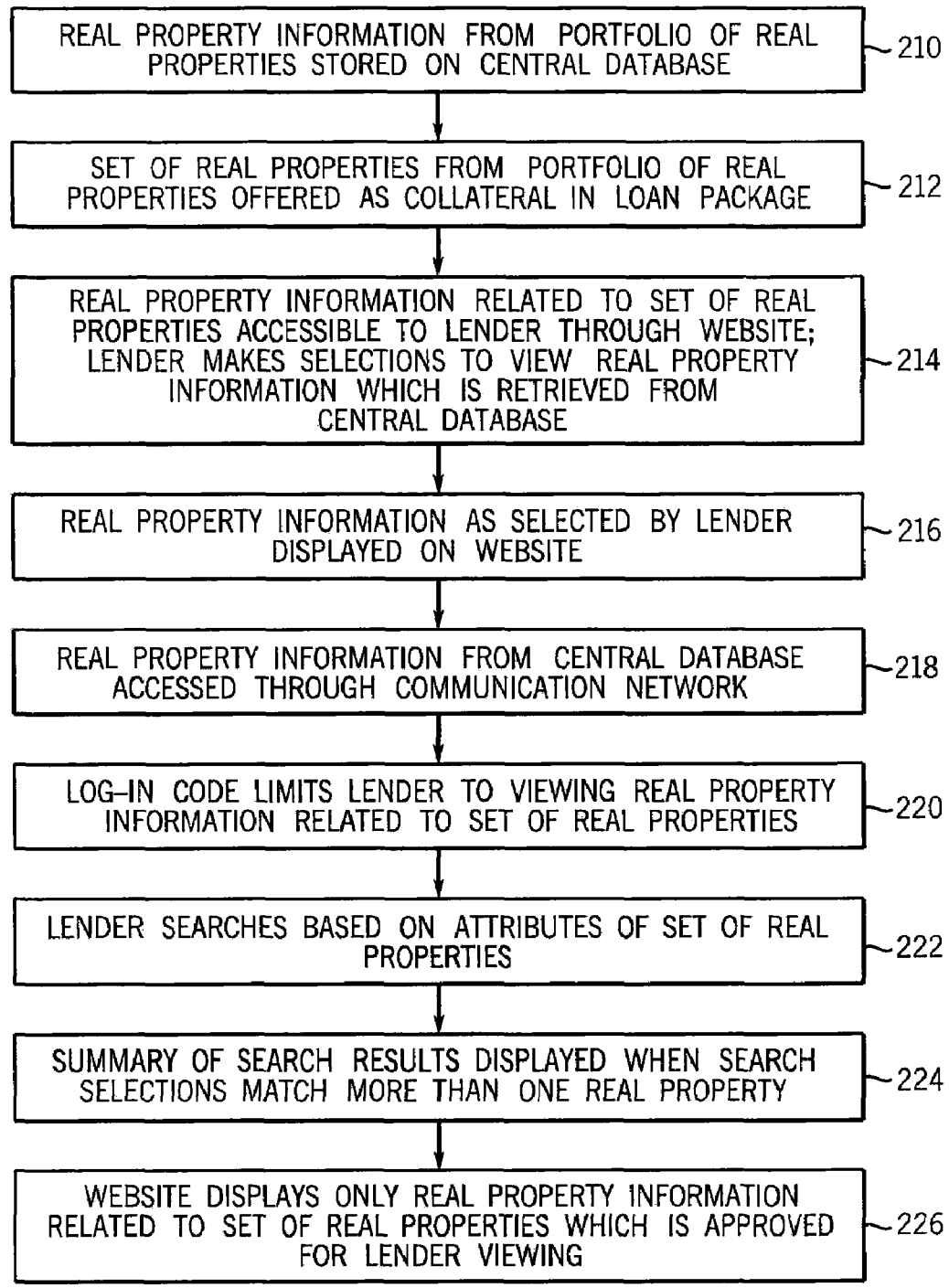
FIG. 17 illustrates the steps of compiling real property information for institutional lenders from a central database.

The steps of compiling real property information from a central database is described in FIG. 17. In step 210, the real property information from portfolio of real properties is stored on a central database. In step 212, the set of real properties from the portfolio of real properties is offered as collateral in a loan package. In step 214, the real property information related to the set of real properties is made accessible to a lender through a website. The lender makes selections to view the real property information which is retrieved from the central database. In step 216, the real property information as selected by the lender is displayed on the website. In step 218, the real property information from the central database is accessed through a communication network. In step 220, the log-in code limits the lender to viewing the real property information related to the set of real properties property information. In step 222, the lender searches based on attributes of the set of real properties property information. In step 224, a summary of search results is displayed when search selections match more than one real property. In step 226, the website displays only real property information related to set of real properties which is approved for lender viewing.

A person skilled in the art will recognize that changes can be made in form and detail and equivalents may be substituted for elements of the invention without departing from the scope and spirit of the invention. The present description is therefore considered in all respects to be illustrative and not restrictive, the scope of the invention being determined by the following claims and their equivalents as supported by the above disclosure and drawings.

What is claimed is:

1. A method of compiling real property information from a central database, comprising:

providing a computer system for executing a website, the computer system being configured to retrieve data from the central database via a computer network;

storing real property information from a portfolio of real properties on the central database, the real property information being organized into a plurality of information categories consisting of general purpose records, infrastructure records, business records, accounting records, and maintenance records, to aid in retrieval of the real property information based on specific requests therefor;

determining a valuation of each of the real properties of the portfolio of real properties;

retrieving the real property information from multiple information categories on the central database;

combining the real property information from the multiple information categories to provide a set of real properties from the portfolio of real properties, the set of real properties to be offered as collateral in a loan package such that a fair market valuation of the set of real properties is at least equal to a value of the loan package in the event of a foreclosure and default sale;

providing access to the real property information related to the set of real properties to a lender through the website by providing a log-in code to the lender which limits the lender to viewing the real property information related to the set of real properties;

providing search selections for the lender to search based on attributes of the set of real properties, wherein the lender makes selections to view the real property information which is retrieved from the central database, wherein the search selections consist of property identification (ID), address, executive summary, lender notes, demographics, owner, lien, building square footage, acres, map, occupancy, environmental, cost, book value, appraisal, property tax, title report, income or expense, competition, budget, rent roll, unit mix, furniture, fixtures and equipment (FFE), and contacts, and wherein the search selections are provided in a single web page;

providing a summary of search results for a plurality of real properties when search selections match more than one real property;

transmitting the real property information to a client computer system;

displaying only a first portion of the real property information related to the set of real properties which is approved for lender viewing;

receiving a request for a second portion of real property information from the lender;

verifying user access privileges of the lender;

adding the second portion of real property information to that approved for lender viewing if the lender has sufficient user access privileges; and displaying the added real property information as selected by the lender on the website, the website including a user interface for filtering the real property information and being transmitted to the client computer system via a computer network.

2. The method of claim 1 further including:

accessing the real property information from the central database through a communication network; and displaying the real property information for the lender operating a computer system remote from the central database.

3. A computer system for compiling real property information from a central database, comprising:

processor means for executing a website, the processor means being configured to retrieve data from the central database via a computer network;

storage means for storing real property information from a portfolio of real properties on the central database, the real property information being organized into a plurality of information categories consisting of general purpose records, infrastructure records, business records, accounting records, and maintenance records, to aid in retrieval of the real property information based on specific requests therefor;

determination means for determining a valuation of each of the real properties of the portfolio of real properties;

retrieval means for retrieving the real property information from multiple information categories on the central database;

combining means for combining the real property information from the multiple information categories to provide a set of real properties from the portfolio of real properties, the set of real properties to be offered as collateral in a loan package such that a fair market valuation of the set of real properties is at least equal to a value of the loan package in the event of a foreclosure and default sale;

access means for providing access to the real property information related to the set of real properties to a lender through the website by providing a log-in code to the lender which limits the lender to viewing the real property information related to the set of real properties;

search selection means for providing search selections for the lender to search based on attributes of the set of real properties, wherein the lender makes selections to view the real property information which is retrieved from the central database, wherein the search selections consist of property identification (ID), address, executive summary, lender notes, demographics, owner, lien, building square footage, acres, map, occupancy, environmental, cost, book value, appraisal, property tax, title report, income or expense, competition, budget, rent roll, unit mix, furniture, fixtures and equipment (FFE), and contacts, and wherein the search selections are provided in a single web page;

summation means for providing a summary of search results for a plurality of real properties when search selections match more than one real property;

transmission means for transmitting the real property information to a client computer system;

first display means for displaying only a first portion of the real property information related to the set of real properties which is approved for lender viewing;

receiving means for receiving a request for a second portion of real property information from the lender;

verification means for verifying user access privileges of the lender;

addition means for adding the second portion of real property information to that approved for lender viewing if the lender has sufficient user access privileges; and second display means for displaying the added real property information as selected by the lender on the website, the website including a user interface for filtering the real property information and being transmitted to the client computer system via a computer network.

4. The computer system of claim 3 further including:

second access means for accessing the real property information from the central database through a communication network; and third display means for displaying the real property information for the lender operating a computer system remote from the central database.

\* \* \* \* \*